(12) United States Patent
Weaver

(10) Patent No.: US 6,223,911 B1
(45) Date of Patent: May 1, 2001

(54) FRAME RACK

(75) Inventor: Donald W. Weaver, New Richmond, OH (US)

(73) Assignee: Richfield Industries, Flint, MI (US)

(\*) Notice: Subject to any disclaimer, the term of this patent is extended or adjusted under 35 U.S.C. 154(b) by 0 days.

(21) Appl. No.: 09/287,804

(22) Filed: Apr. 7, 1999

(51) Int. Cl.$^7$ ....................................................... A47F 5/00
(52) U.S. Cl. ............................................ 211/41.1; 211/150
(58) Field of Search ................................... 211/150, 13.1, 211/149, 59.4, 49.1, 41.1; 312/9.58; 248/345.1

(56) References Cited

U.S. PATENT DOCUMENTS

| | | | |
|---|---|---|---|
| 1,824,822 | \* 9/1931 | Kradolfer | 211/150 |
| 2,460,533 | \* 2/1949 | Potts | 211/150 X |
| 2,827,200 | \* 3/1958 | Lux | 211/150 X |
| 2,982,419 | \* 5/1961 | Shield | 211/49.1 |
| 3,151,576 | \* 10/1964 | Patterson | 211/150 X |
| 4,549,663 | \* 10/1985 | Corbett, Jr. et al. | 211/13.1 |
| 4,572,382 | \* 2/1986 | Niederprum | 211/150 |
| 4,688,681 | \* 8/1987 | Bergeron | 211/150 X |
| 4,712,691 | \* 12/1987 | Grill et al. | 211/49.1 |
| 5,005,712 | \* 4/1991 | Niederprum | 211/150 |
| 5,301,824 | \* 4/1994 | Schoeller | 211/59.4 |
| 5,938,051 | \* 8/1999 | Scholler et al. | 211/150 |

FOREIGN PATENT DOCUMENTS

| | | | | |
|---|---|---|---|---|
| 494357 | \* | 7/1953 | (CA) | 211/150 |
| 49210 | \* | 11/1992 | (DE) | 211/150 |

\* cited by examiner

*Primary Examiner*—Daniel P. Stodola
*Assistant Examiner*—Khoa Tran
(74) *Attorney, Agent, or Firm*—Reising, Ethington, Barnes, Kisselle, Learman & McCulloch, P.

(57) ABSTRACT

A support rack for releasably and securely holding and separately supporting a plurality of objects. The rack has a plurality of arms each of which is constructed to support a separate object such as an automobile frame. The arms of the rack are linked together such that when an object is placed on a first arm, a second arm is moved into position to receive the next object to be loaded onto the rack. When the next object is loaded onto the second arm, a third arm is moved into position to receive the next object to be loaded onto the rack, and so on. In addition to moving the succeeding arm into position to receive an object, when an object is loaded onto an arm a lock adjacent to the preceding arm is preferably also moved into a locking position securing the object on the preceding arm. For example, when an object is placed onto the second arm of the rack, the third arm is moved into position to receive an object as described above and a lock adjacent the first arm is simultaneously moved to its locking position to secure an object on the first arm.

10 Claims, 3 Drawing Sheets

FRAME RACK

FIELD OF THE INVENTION

This invention relates generally to a support rack and more particularly to a rack for holding multiple objects, such as automobile frames, which is especially adapted for securing such objects for transportation or storage.

BACKGROUND OF THE INVENTION

Frames for vehicles such as automobiles and the like are typically fabricated from steel at one location and are shipped to another location for assembly of the vehicle. A plurality of frames are transported on pallets received on the bed of a truck or a railroad car. The frames are typically stacked one on top of another with individual spacers manually placed between adjacent frames to protect them during shipping. One or more chains are needed to secure the frames to the pallet and undesirably, each frame bears the weight of each frame stacked on top of it. Further, a stack of frames loaded in this manner is unstable.

SUMMARY OF THE INVENTION

A support rack is provided for releasably and securely holding and separately supporting a plurality of objects. The rack has a plurality of arms each of which is constructed to support a separate object such as an automobile frame. The arms of the rack are linked together such that when an object is placed on a first arm, a second arm is moved into position to receive the next object to be loaded onto the rack. When the next object is loaded onto the second arm, a third arm is moved into position to receive the next object to be loaded onto the rack, and so on. In addition to moving the succeeding arm into position to receive an object, when an object is loaded onto an arm a lock adjacent to the preceding arm is preferably also moved into a locking position securing the object on the preceding arm. For example, when an object is placed onto the second arm of the rack, the third arm is moved into position to receive an object as described above and a lock adjacent the first arm is simultaneously moved to its locking position to secure an object on the first arm.

Similarly, the rack is constructed such that when unloading objects from the rack the arms rotate out of the way to avoid interference with the unloading of subsequent objects and the locks of preceding arms are automatically disengaged as the object from the adjacent arm is removed. Thus, the rack facilitates automated loading and unloading of the objects to eliminate manual labor and eliminate the need for individual spacers between adjacent objects.

Objects, features and advantages of this invention include providing a rack for multiple objects which securely and releasably holds the objects, individually supports multiple objects, facilitates automated loading and unloading of multiple objects, automatically locks and securely holds objects onto the rack during loading, automatically unlocks objects from the rack during unloading, increases the stability of a stack of objects, facilitates securing multiple objects to a pallet, is rugged, durable, reliable and of relative simple design and economical manufacture and assembly.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
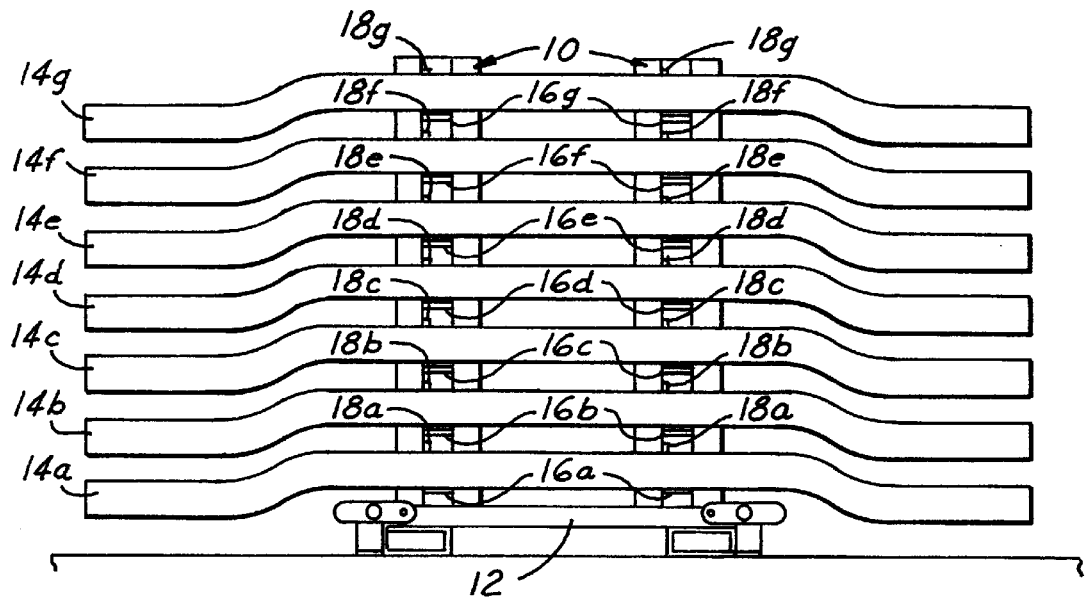
FIG. 1 is a side view of a plurality of automobile frames received on a plurality of racks embodying the present invention and each received on a shipping pallet.
Figure 2:
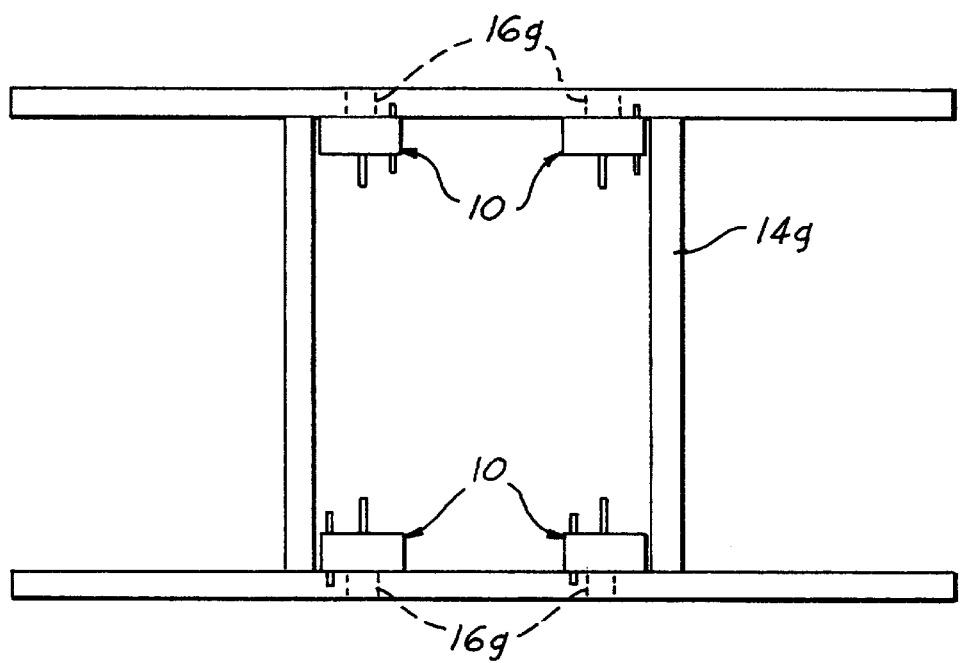
FIG. 2 is a top view of the stack of frames loaded on the racks as in FIG. 1.

Referring in more detail to the drawings, FIG. 1 illustrates a plurality of support racks 10 mounted on a pallet 12 and receiving and securely holding thereon a plurality of automobile frames 14a–14g for shipping or storage of the frames. As shown in FIG. 2, four support racks 10 may be used to support the frames 14a–14g at four different locations. Less than or more than four racks 10 may be used depending on the particular application. Each frame 14a–14g is supported by an arm 16a–16g of each rack 10 and is releasably held thereon by an overlapping locking body 18a–18g to securely hold the frames on the racks 10 during shipping or storage.

Figure 4:
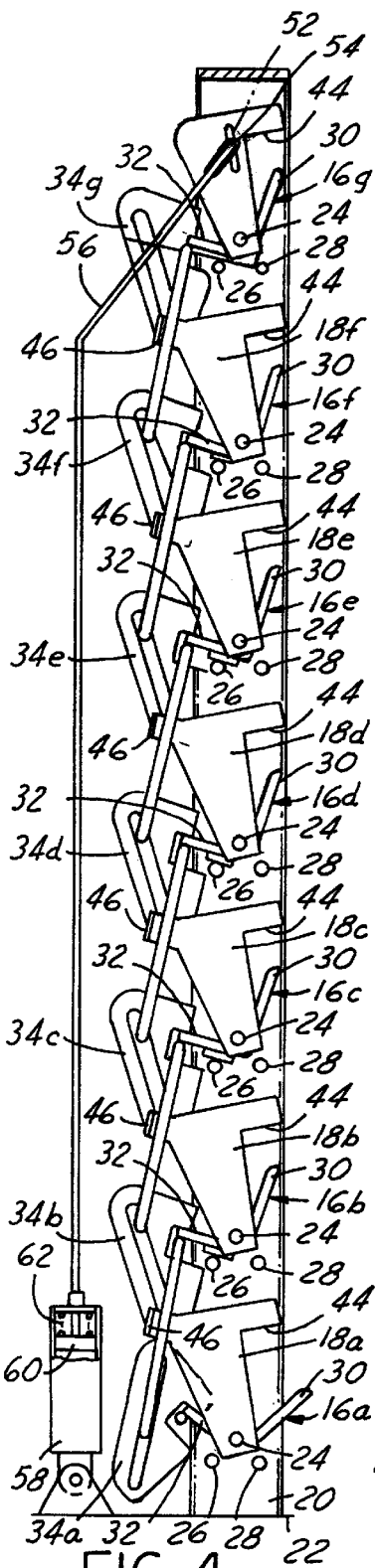
FIG. 4 is a sectional view taken along line 4—4 of FIG. 3.
Figure 3:
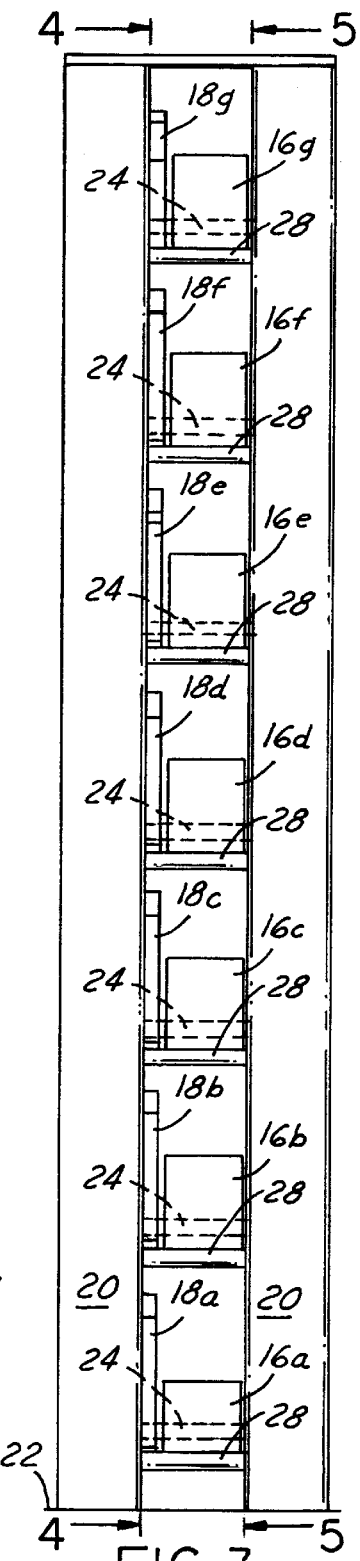
FIG. 3 is a front view of a rack embodying the present invention.
Figure 5:
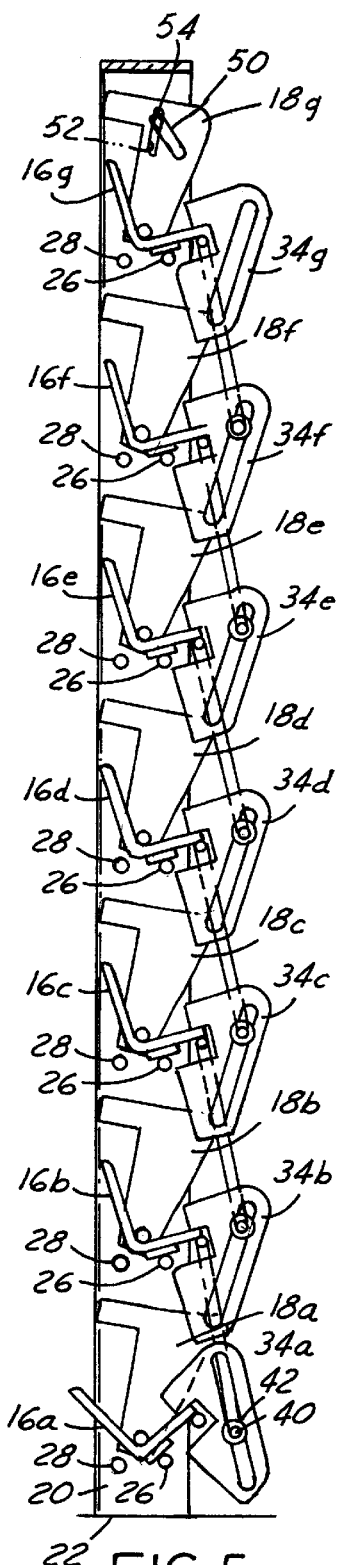
FIG. 5 is a sectional view taken along line 5—5 of FIG. 3.

As shown in FIG. 3, each rack 10 preferably has a pair of spaced apart generally parallel uprights 20 extending from a base 22 or secured directly to a shipping pallet 12. As best shown in FIGS. 3–5, each arm 16a–16g and its associated locking body 18a–18g are pivotally carried on a pivot pin 24 extending between the uprights 20. First and second stops 26, 28 extending between the uprights 20 limit the pivotal movement of the arms 16a–16g in each direction and between retracted and extended positions. Each arm 16a–16g is preferably generally L-shaped with the pivot pin 24 received between the ends of the arm providing a support portion 30 on one side of the pin 24 and an actuating portion 32 on the other side of the pin 24.

An actuator link 34a–34g is preferably fixed to the actuating portion 32 of each arm 16a–16g. Each actuator link 34a–34g has an elongated slot 36 formed therethrough defining a track in which one end of a connecting link 38a–38f is slidably received. When an arm 16a–16g is in its extended position, the slot 36 formed in the actuator link 34a–34g is preferably inclined at an acute included angle relative to a line 37 perpendicular to the uprights. Desirably, an angle (FIG. 7) defined between the slot 36 and this line is between 20° and 60° and preferably about 30° for smoothest operation of the rack 10 with the least interference of movement between its components.

The connecting links 38 are each preferably a generally straight rod having a bent end 40 slidably received in the slot 36 in the adjacent actuator link with a stop 42, such as a washer or other projection, fixed thereon to retain the bent end within the slot 36. The other end of each connecting link 38a–38f is preferably fixed to either the actuating portion of the adjacent, immediately above arm 16 or the actuator link 34 connected to the immediately above arm 16. The connecting links 38a–38f provide a lost motion coupling between adjacent arms 16a–16g and are constructed to provide at least some rotational movement of one arm upon rotational movement of an adjacent arm.

As noted, a locking body 18a–18g is associated with each arm 16a–16g to releasably secure an object, such as an automobile frame 14, onto the arm 16a–16g. Each locking body 18a–18g preferably has a generally outwardly extending flange 44 constructed to overlie an upper surface of a frame 14a–14g supported on the arm 16a–16g associated with that locking body to releasably clamp the frame between the flange 44 and support portion 30 of the arm. Each locking body 18a–18f, except the locking body 18g for the uppermost arm 16g, has a U-shaped channel 46 constructed to slidably receive a connecting link 38a–38f and provide a lost motion coupling between the connecting link and the locking body to cause rotational movement of the locking body during at least part of the range of motion of the connecting link.

The locking body 18g for the uppermost arm 16g for the uppermost arm 16g is not actuated by a connecting link and is independently actuated. An inclined slot 50 in locking body 18g and a vertical slot 52 in the uprights 20 receive a pin 54 connected to an actuating rod 56 of a power cylinder 58 such as a pneumatic or hydraulic cylinder. Through the actuating rod 56, the power cylinder 58 drives the pin 54 between first and second position in slots 50, 52 to move locking body 18g between its locked and unlocked positions. The power cylinder 58 may have a piston 60 yieldably biased by a spring 62 to bias the locking body 18g to its locked or unlocked position as desired.

Operation

Figure 6:
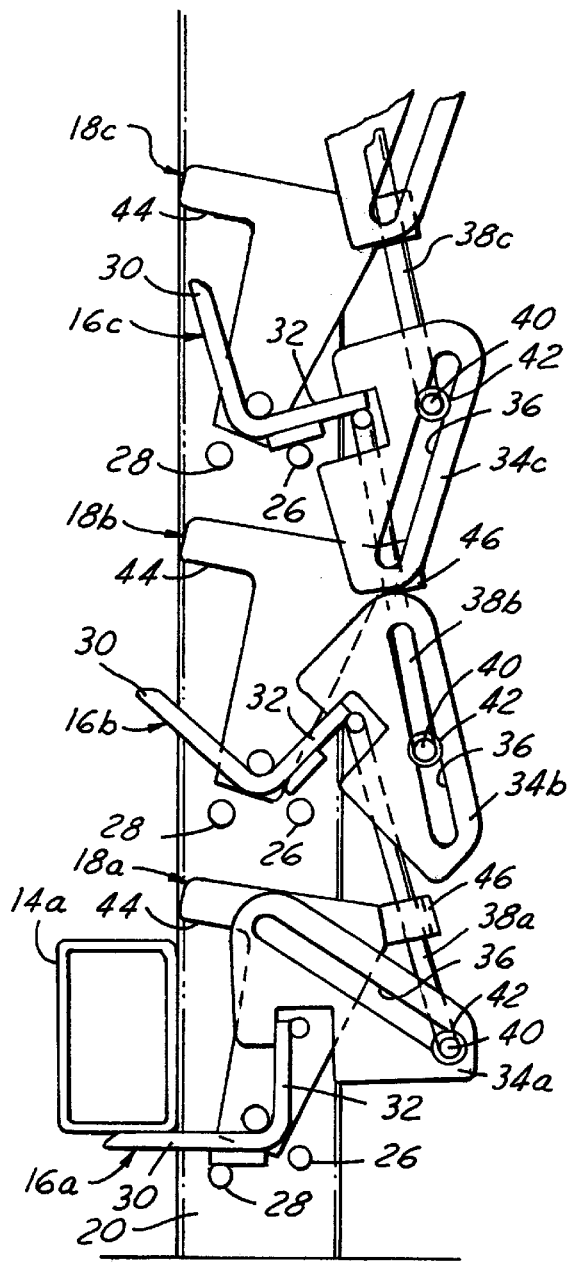
FIG. 6 is a fragmentary sectional view as in FIG. 5 illustrating a single frame loaded on the rack.

As shown in FIGS. 4 and 5, the first stop 26, for the first (or lowermost) arm 16a, is positioned to limit movement of the first arm 16a toward its retracted position so that at least the support portion 30 of the first arm 16a extends beyond the uprights 20 when the first arm is in its retracted position. This end of the support portion 30 of the first arm 16a extends outwardly from the uprights 20 to engage the first automobile frame 14a, which is lowered vertically relative to the racks 10. As shown in FIG. 6, when the first frame 14a is received on the first arm 16a, the weight of the first frame 14a rotates the first arm 16a generally counterclockwise (as viewed in FIG. 6) about its pivot pin 24 until it engages its second stop 28 disposing the support portion 30 of the first arm 16a in a horizontal position generally perpendicular to the uprights 22.

This rotation of the first arm 16a causes a corresponding rotation of the actuator link 34a attached to the first arm 16a. This movement of the actuator link 34a changes the location and orientation of its slot 36 relative to the connecting link 38a associated therewith. More specifically, the connecting link 38a will be engaged by one end of the slot 36 in the actuator link 34a and will be displaced causing the second arm 16b attached to the connecting link 38a, and the second actuator link 34b attached to the second arm 16b, to rotate generally counterclockwise about its pivot pin 24 to position the second arm 16b in an intermediate position between its retracted and extended positions. When in this intermediate position, an end of the support portion 30 of the second arm 16b extends beyond the uprights 22 at an angle thereto so that it is engaged by a second frame 14b subsequently lowered onto the racks 10.

When the second frame 14b is lowered onto the racks 10 and into engagement with the support portion 30 of the second arm 16b, the weight of the second frame 14b causes the second arm 16b to rotate further toward its extended position until the second arm 16b engages its second stop 28. This movement of the second arm 16b to its fully extended position causes an associated rotation of the second actuator link 34b and the second connecting link 38b to move the third arm 16c into its intermediate position in the same manner as described with regard to the movement of the second arm 16b to its intermediate position. In a similar manner, loading subsequent frames 14c–14g onto subsequent arms 16c–16g will cause movement of the next arm (if any) into its intermediate position to receive the next frame to be loaded onto the rack.

Figure 7:
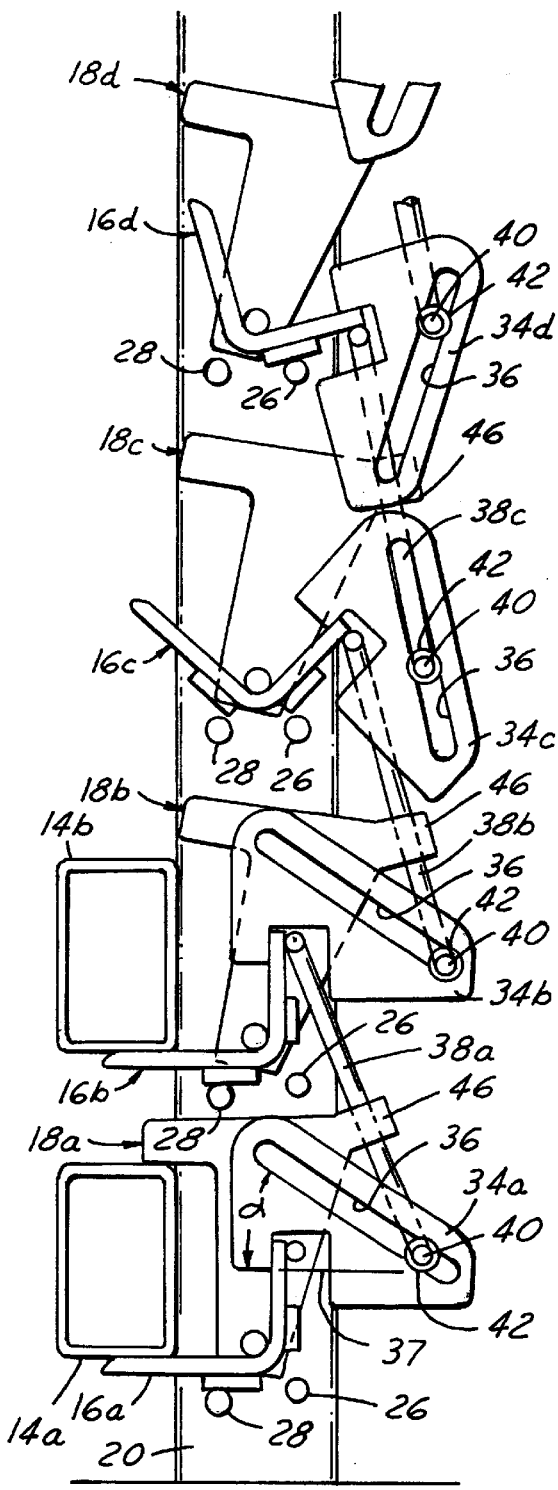
FIG. 7 is a fragmentary sectional view as in FIG. 6 illustrating two frames loaded onto the rack.

To more securely hold the frames 14a-14g on the racks 10, the locking bodies 18a–18g are moved into their locked positions with a portion of their flange 44 overlying a portion of the associated frame 14a–14g when the adjacent and above arm is rotated to its fully extended position. More specifically, as shown in FIG. 7, rotation of the second arm 16b to its fully extended position displaces the first connecting link 38a which has one end attached to the second arm 16b. This displacement of the first connecting link 38a causes the first connecting link 38a to bear on the first locking body 18a from within its channel 46 to rotate the first locking body 18a counterclockwise about its pivot pin 24 and into its locked position overlying a portion of the frame 14a.

Thus, when the first frame 14a is loaded onto the racks 10 the first arm 14a is moved to its extended position and the second arm is moved into its intermediate position to receive the second frame 14b to be loaded on the racks 10. When subsequent frames are loaded onto the racks 10, the next consecutive arm is moved into its intermediate position to receive the next consecutive frame and the locking body of the preceding arm is rotated into its locked position. In this manner, the racks 10 facilitate the loading, one after another, of a plurality of frames onto the racks for shipping or storage. Advantageously, the racks 10 also provide an automatically actuated locking mechanism to more firmly secure each of the frames onto its associated arm.

Because the locking bodies 18a–18f rely on movement of a succeeding or above arm, the locking body 18g associated with the uppermost arm 16g on the racks 10 is not automatically rotated into place by the loading of a frame onto the rack. Rather, as shown in FIGS. 4 and 5, the uppermost locking body 18g is driven by the power cylinder 58. As the actuating rod 56 is retracted, the pin 54 slides downwardly in the slots 52 in the upright 20 and, due to the inclination of the slot 50 in the locking body 18g relative to the slots 52 in the uprights 20, causes the pin 54 to bear on the locking body 18g and rotate it generally clockwise (as viewed in FIG. 4) to its locked position. To permit the uppermost frame 14g to be removed from the racks 10, the locking body 18g is rotated counterclockwise to its unlocked position by moving the actuating rod 56 to its extended position moving the pin 54 upwardly in slot 52.

As shown, the power cylinder 58 may have a piston 60 slidably received therein and yieldably biased by a spring 62 to bias the actuating rod 56 to its retracted position and hence, the uppermost locking body 18g in its locked position. The power cylinder 58 can be actuated to move the piston 60 against the bias of the spring and thereby move the actuating rod 56 to its extended position. In the alternative, the piston 60 could be yieldably biased in the other direction, tending to move the actuating rod 56 to its extended position hence, biasing the uppermost locking body 18g to its unlocked position until a sufficient force is applied to the piston 60 to overcome the biasing force and move the locking body 18g to its locked position. As a further alternative, the uppermost locking body 18g can be manually actuated or actuated by some other mechanical, electrical or other means as desired for a particular application.

To unload the frames 14a–14g from fully loaded racks 10, the uppermost locking body 18g must be moved to its unlocked position so that the uppermost frame 14g can be removed from the racks 10. In general, when a frame is unloaded from the racks, the arm it was carried on is preferably automatically rotated toward its retracted position by the force of gravity acting on the arm, its actuating link and the connecting link fixed to the arm. To accomplish this, the actuator links 34a–34g and connecting links 38a–38f are attached to their associated arm 16a–16g at a location spaced from the pivot pins 24 and on the opposite side of the pivot pins 24 from the support portion 30 of the arms. The actuating links 34a–34g and connecting links 38a–38f may also be made of steel or some other relatively heavy material to increase the force of gravity tending to rotate the arms 16a–16g toward their retracted positions when they are not loaded with a frame.

When a frame is removed from an arm, rotation of the arm toward its retracted position by this force of gravity is limited to its intermediate position by engagement of one end of the connecting link attached to the arm with one end of the slot in the actuator link immediately below the arm. Rotation of the actuator link immediately below the arm is prevented by the weight of a frame loaded onto the arm to which that actuator link is attached.

More specifically, as shown in FIG. 7, with a frame 14b loaded on the second arm 16b, the rotation of the third arm 16c to its retracted position is limited by the engagement of the connecting link 38b with the second actuator link 34b from within its slot 36. As shown in FIG. 6, when the frame 14b is removed from the second arm 16b, the second arm 16b rotates to its intermediate position displacing the second actuator 34b link connected thereto and thereby disengaging the connecting link 38b from the end of the slot 36 of the actuator link 34b and permitting the third arm 16c to rotate to its fully retracted position.

At the same time, movement of the first connecting link 38a, due to rotation of the second arm 16b, causes the first connecting link 38a to bear on the first locking body 18a to rotate the first locking body 18a out of its locked position so that the frame 14a on the first arm 16a can be subsequently unloaded from the racks 10.

Thus, the racks 10 automatically position the support arms 16a–16b to receive subsequent frames on the racks 10 during the loading of the racks and also automatically move all but the very last locking body 18g into a locked position to secure frames on the racks 10 during loading. Similarly, during unloading the racks 10 automatically reset themselves to automatically move the locking bodies 18a–18f to their unlocked position and to automatically move the support arms 16a–16g out of the way to permit substantially automatic unloading of the frames from the racks. Thus, the labor intensive process of inserting individual spacers between adjacent frames loaded onto a pallet is avoided and the racks 10 of the present invention may be substantially automatically loaded and unloaded such as by a robot or other machine. Further, each frame on the racks is individually supported so that a frame does not have to bear the load of subsequent frames loaded thereon. Still further, all of the above advantages are achieved with a relatively simple mechanical linkage and by the force of gravity acting on the linkage to avoid the cost and complexity of mechanical or electromechanical systems to automatically set and reset the racks during loading and unloading.

Other variations and modifications are possible without departing from the scope and spirit of the present invention as defined by the appended claims.

What is claimed is:
1. A rack for supporting multiple objects, comprising:
at least one upright constructed to extend vertically from a base;
a first arm and a second arm each pivotally carried by the upright and moveable between a retracted position and an extended position wherein at least a portion of the arms extend outwardly and generally horizontally from the upright to support thereon one of the objects;
an actuator link operably associated with the first arm and another actuator link operably associated with the second arm, each actuator link is moveable to control at least in part an associated movement of its respective arm from its retracted position at least partially toward its extended position;
a connecting link connected between the actuator link associated with the first arm and the actuator link associated with the second arm and responsive at least to movement of the actuator link associated with the first arm as the first arm moves to its extended position to cause movement of the second arm from its retracted position towards its extended position whereby, when a first one of the objects is placed on the first arm and the first arm is moved to its extended position, the second arm is rotated at least partially towards its extended position to facilitate placement of a second one of the objects on the second arm and subsequent movement of the second arm to its extended position supporting the second one of the objects thereon and wherein at least the actuator link associated with the first arm has a slot formed therein and one end of the connecting link is slidably received in the slot and another end of the connecting link is operably connected to the actuator link associated with the second arm to provide a lost motion coupling between both of said actuator links.

2. The rack of claim 1 which also comprises a plurality of additional arms pivotally carried by the upright and moveable between retracted and extended positions, a plurality of additional actuator links each associated with a separate one of said additional arms to move its associated arm from its retracted position at least partially towards its extended position, and a plurality of connecting links providing a total number of connecting links of one less than the total number of arms, each connecting link being connected between a pair of adjacent actuator links and responsive to at least a portion of the range of movement of one of its associated actuator links to cause movement of its other associated actuator link which in turn moves the arm associated with said other associated actuator link from its retracted position towards its extended position to cause successive movement of adjacent arms as consecutive objects are loaded onto the rack.

3. The rack of claim 2 which also comprises a plurality of locking bodies, one for each arm, each carried by the upright adjacent a separate arm and all but the uppermost locking body having a separate connecting link slidably connected therewith, each locking body, except the uppermost locking body, is moveable between an unlocked position spaced from an object received on the adjacent arm and a locked position restraining movement in at least one direction of an object on the adjacent arm in response to movement of its associated connecting link during at least a portion of the range of movement of its associated connecting link with the uppermost locking body being independently moveable between its locked and unlocked positions.

4. The rack of claim 3 which also comprises a fluid cylinder having a piston moveable between first and second positions and a piston rod attached at one end to the piston and at its other end to the uppermost locking body such that when the piston is in its first position the uppermost locking body is in its locked position and when the piston is in its second position, the uppermost locking body is in its unlocked position.

5. The rack of claim 1 wherein when the first arm is in its extended position the slot is inclined at an acute included angle relative to a line generally perpendicular to the upright.

6. The rack of claim 5 wherein when the first arm is in its extended position the slot is inclined at an angle of between 20 and 45 degrees relative to said line generally perpendicular to the upright.

7. The rack of claim 5 wherein when the first arm is in its extended position the slot is inclined at an angle of 30 degrees relative to said line generally perpendicular to the upright.

8. The rack of claim 1 which comprises a pair of generally parallel uprights, one pivot pin for each arm extending between the uprights and about which the arms pivot and a pair of stops for each arm carried by at least one upright and being engageable with the arms to define the extended and retracted positions of the arms.

9. A rack for supporting multiple objects, comprising:
   at least one upright constructed to extend vertically from a base;
   a first arm and a second arm each pivotally carried by the upright and moveable between a retracted position and an extended position wherein at least a portion of the arms extend outwardly and generally horizontally from the upright to support thereon one of the objects;
   an actuator link operably associated with the first arm and another actuator link operably associated with the second arm, each actuator link is moveable to control at least in part an associated movement of its respective arm from its retracted position at least partially toward its extended position;
   a connecting link connected between the actuator link associated with the first arm and the actuator link associated with the second arm and responsive at least to movement of the actuator link associated with the first arm as the first arm moves to its extended position to cause movement of the second arm from its retracted position towards its extended position whereby, when a first one of the objects is placed on the first arm and the first arm is moved to its extended position, the second arm is rotated at least partially towards its extended position to facilitate placement of a second one of the objects on the second arm and subsequent movement of the second arm to its extended position supporting the second one of the objects thereon;
   a locking body pivotally carried by the upright adjacent to the first arm, said locking body being slidably connected to the connecting link, the locking body is moveable from an unlocked position to a locked position restraining movement in at least one direction of the first one of the objects on the first arm in response to movement of the connecting link caused by movement of the second arm to its extended position and the locking body is moveable from its locked position to its unlocked position in response to movement of the connecting link caused by movement of the second arm from its extended position towards its retracted position, and the locking body has an opening through which the connecting link is slidably received to provide a lost motion coupling between the locking body and connecting link such that the connecting link bears on and causes movement of the locking body during only a portion of its range of movement.

10. The rack of claim 4 wherein the opening is defined by a U-shaped channel extending from the locking body.

\* \* \* \* \*